(12) United States Patent
Krautter et al.

(10) Patent No.: US 11,975,700 B2
(45) Date of Patent: May 7, 2024

(54) METHOD FOR ASCERTAINING A FUTURE WHEEL BRAKE PRESSURE OF A HYDRAULIC VEHICLE BRAKING SYSTEM

(71) Applicant: Robert Bosch GmbH, Stuttgart (DE)

(72) Inventors: Andreas Krautter, Steinheim (DE); Johannes Von Keler, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 570 days.

(21) Appl. No.: 17/275,101

(22) PCT Filed: Sep. 21, 2019

(86) PCT No.: PCT/EP2019/075433
§ 371 (c)(1),
(2) Date: Mar. 10, 2021

(87) PCT Pub. No.: WO2020/108818
PCT Pub. Date: Jun. 4, 2020

(65) Prior Publication Data
US 2022/0080941 A1     Mar. 17, 2022

(30) Foreign Application Priority Data
Nov. 29, 2018   (DE) .......................... 102018220557.4

(51) Int. Cl.
*B60T 13/00*     (2006.01)
*B60T 13/68*     (2006.01)
*B60T 17/22*     (2006.01)

(52) U.S. Cl.
CPC .......... *B60T 17/221* (2013.01); *B60T 13/686* (2013.01); *B60T 2270/10* (2013.01); *B60T 2270/88* (2013.01)

(58) Field of Classification Search
CPC .. B60T 17/221; B60T 13/686; B60T 2270/10; B60T 2270/88
See application file for complete search history.

(56) References Cited

U.S. PATENT DOCUMENTS

| | | | |
|---|---|---|---|
| 2003/0111896 A1* | 6/2003 | Imamura | B60T 17/221 303/11 |
| 2012/0013173 A1* | 1/2012 | Leiber | B60T 13/745 303/189 |

(Continued)

FOREIGN PATENT DOCUMENTS

| | | |
|---|---|---|
| DE | 102015215926 A1 | 2/2017 |
| GB | 2403520 A | 1/2005 |

OTHER PUBLICATIONS

International Search Report for PCT/EP2019/075433, dated Jan. 15, 2020.

*Primary Examiner* — Nicholas J Lane
(74) *Attorney, Agent, or Firm* — NORTON ROSE FULBRIGHT US LLP; Gerard A. Messina

(57) ABSTRACT

For ascertaining a future wheel brake pressure, pressure generator pressures of an external power brake pressure generator are continuously measured at measurement time intervals, the wheel brake pressure changes are ascertained therefrom, and the sum of the wheel brake pressure changes ascertained during a time period prior to the measurement is added to the last measured pressure generator pressure. The wheel brake pressure thus ascertained is considered to be the wheel brake pressure that will prevail after the time period following the measurement of the pressure generator pressure in a wheel brake.

8 Claims, 1 Drawing Sheet

(56) References Cited

U.S. PATENT DOCUMENTS

| | | |
|---|---|---|
| 2015/0027113 A1 | 1/2015 | Biller |
| 2016/0096434 A1* | 4/2016 | Nakaoka ............. B60W 10/192 |
| | | 701/78 |
| 2016/0221559 A1* | 8/2016 | Kim ........................ B60T 8/367 |
| 2018/0126971 A1* | 5/2018 | Leiber ................... B60T 13/741 |

* cited by examiner

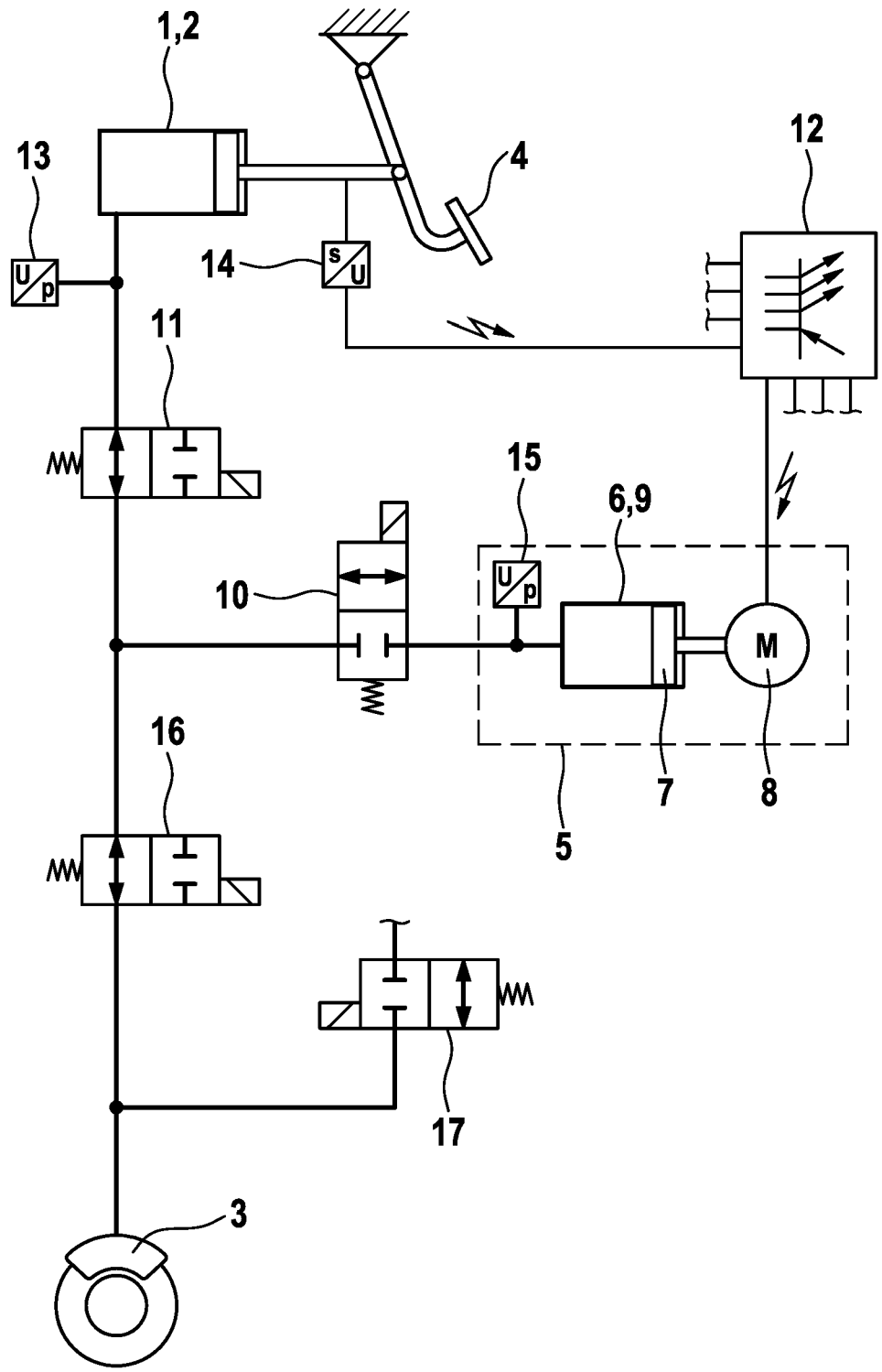

METHOD FOR ASCERTAINING A FUTURE WHEEL BRAKE PRESSURE OF A HYDRAULIC VEHICLE BRAKING SYSTEM

The present invention relates to a method for ascertaining a future wheel brake pressure of a hydraulic vehicle braking system. The method is to improve a pressure control or a start of a pressure control in hydraulic wheel brakes of the vehicle braking system. The vehicle braking system includes a brake pressure generator, to which a pressure sensor is connected, and to which one or multiple hydraulic wheel brake(s) is/are connected respectively via a valve. The valve will also be referred to here as an inlet valve for the purpose of its unique identification, which is not to limit the present invention, however. Pressure sensors at the wheel brakes are possible within the scope of the present invention, but are neither provided per se nor necessary.

The brake pressure generator may be a brake master cylinder that is actuatable by hand through a hand brake lever or by foot through a foot brake pedal, i.e., a brake master cylinder that is in general actuatable with the aid of muscular power or assisted power. "Assisted power" means intensification of the muscular power with the aid of a brake booster, for example a vacuum or an electromechanical brake booster. In addition to or instead of the muscular or assisted power brake pressure generator, the vehicle braking system may include an external power brake pressure generator.

In addition to the valve(s), via which the hydraulic wheel brake(s) is/are connected to the brake pressure generator and which is/are also referred to in the present case as (an) inlet valve(s), the vehicle braking system preferably includes a further valve for each wheel brake, through which wheel brake pressures in the wheel brakes may be reduced. The further valve(s) is/are also referred to here as (an) outlet valve(s) for the purpose of their unique identification and of differentiation from the inlet valve(s), which is not to limit the present invention, however.

The wheel brake pressures in the wheel brakes are controlled to generate a desirable brake force and/or for slip controls, such as anti-lock systems, traction control systems and/or a vehicle dynamics control system or an electronic stability program, for which the abbreviations ABS, TCS, VDC and ESP are commonly used. The vehicle dynamics control system or the electronic stability program is colloquially often also referred to as an anti-skid control system. A control is also understood to mean a management of the wheel brake pressures.

To be able to control the wheel brake pressures in the wheel brakes, it is preferable to know the wheel brake pressures that will prevail in a time period of typically some ms to some 10 ms following a measurement of a pressure generator pressure in the brake pressure generator in the wheel brakes of the vehicle braking system, to be able to close the valve(s), via which the hydraulic wheel brake(s) are connected to the brake pressure generator, and then to be able to start the pressure control.

An extrapolation of the pressure generator pressure measured in the brake pressure generator with the aid of the pressure sensor after the time period would be possible on the basis of the two or more last pressure measurements. In the case of highly dynamic pressure changes subject to rapidly increasing pressure, an extrapolation of a measured value of the pressure generator pressure results in imprecise and in some cases significantly fluctuating extrapolated pressures that are usually unusable for the control or the start of the control.

SUMMARY

The present invention provides a different type of ascertainment of the future wheel brake pressures in the wheel brakes of the vehicle braking system in a time period following the measurement of the pressure generator pressure, the time period being a response time of the pressure sensor in particular and a closing time of the valve(s), which is/are referred to here as (an) inlet valve(s) and via which the hydraulic wheel brake(s) is/are connected to the brake pressure generator. The response time of the pressure sensor is the time that elapses from a change in the pressure generator pressure until a change in an output signal of the pressure sensor. The closing time of the valve is the time that elapses from an activation of the valve until the valve is closed.

According to an example embodiment of the present invention, a wheel brake pressure change in the wheel brake(s) is ascertained for each measurement of the pressure generator pressure during a measurement time interval following the particular measurement of the pressure generator pressure. The measurement time interval is the time period between two consecutive measurements of the pressure generator pressure. The measurement time interval is preferably constant, but it may generally also be variable. The measurement time interval may also be referred to as a clock cycle (reciprocal value of a clock frequency), sampling time or sampling rate. The measurement time interval, in which the pressure generator pressure is measured, is shorter than the time period, for which the wheel brake pressure(s) is/are to be ascertained following the measurement. The time period is preferably a low, integer multiple of the measurement time interval.

The wheel brake pressure change(s) as a result of the pressure generator pressure may for example be computed with the aid of a flow equation, for example a Bernoulli equation, retrieved from a characteristic diagram or ascertained in another manner. The characteristic diagram of the vehicle braking system may be ascertained experimentally, for example.

As the wheel brake pressure, which will prevail in the wheel brake(s) after the time period following the measurement of the pressure generator pressure, the wheel brake pressure changes ascertained during an equally long time period prior to the (last) measurement of the pressure generator pressure, are added to the (last) measured pressure generator pressure, the wheel brake pressure change ascertained at the (last) measurement being the (last) added wheel brake pressure change.

The method according to an example embodiment of the present invention provides quite precise values of the wheel brake pressures that will prevail in the wheel brakes after the time period including the response time of the pressure sensor and the closing time of the inlet valve(s) following a measurement of the pressure generator pressure. The values of the wheel brake pressures ascertained with the aid of the method according to an example embodiment of the present invention are in any case precise enough to establish the point in time of the closing of the inlet valves and the start of the control of the wheel brake pressures. During and for the control of the wheel brake pressures, the inlet valves may also be reopened.

Refinements and advantageous embodiments of the present invention are described herein.

All features provided in the present description may be implemented individually or in any arbitrary combination in general in the specific embodiments of the present invention.

Embodiments of the present invention that have not all, but only one or multiple features of the present description are possible in general.

BRIEF DESCRIPTION OF THE DRAWINGS

The present invention is explained in greater detail below on the basis of one specific example embodiment illustrated in the FIGURE.

FIG. 1 shows a schematic illustration of a hydraulic muscular power and external power vehicle braking system for the purpose of elucidating a method according to an example embodiment of the present invention.

DETAILED DESCRIPTION OF EXAMPLE EMBODIMENTS

The hydraulic vehicle braking system illustrated in a simplified manner in FIG. 1 is a muscular power and external power vehicle braking system. It includes a brake master cylinder 1 that may be in general understood to mean a muscular power brake pressure generator 2. One or preferably multiple brake circuits having one or multiple hydraulic wheel brakes 3 in each case is/are connected to brake master cylinder 1. A single circuit brake master cylinder 1, to which a brake circuit is connected, is shown in the drawing. The vehicle braking system preferably includes a dual circuit brake master cylinder 1, to which two brake circuits are connected, each having one or multiple wheel brake(s) 3. The vehicle braking system includes two wheel brakes 3 in each brake circuit, for example. Brake master cylinder 1 is actuatable using muscular power with the aid of a brake pedal 4 or a hand brake lever (not shown) and may include a brake booster (not illustrated).

As a further brake pressure generator, the vehicle braking system includes an external power brake pressure generator 5 having a piston cylinder unit 6, whose piston 7 is displaceable with the aid of an electric motor 8 via a screw drive (not illustrated) in a cylinder 9 for the purpose of generating a brake pressure in the vehicle braking system. Each brake circuit is connected through an external power valve 10 to cylinder 9 of piston cylinder unit 6 of external power brake pressure generator 5.

To actuate the vehicle braking system, a brake pressure is generated with the aid of external power brake pressure generator 5 and the brake pressure is applied to wheel brake(s) 3 by opening external power valve(s) 10. Brake master cylinder 1 is hydraulically separated from the vehicle braking system by closing a separating valve 11, each brake circuit being connected via a separating valve 11 in each case to brake master cylinder 1, which forms a muscular power brake pressure generator 2 as already described above.

In the case of the external power actuation, brake master cylinder 1 is used as a setpoint generator for the brake pressure that is to be generated by external power brake pressure generator 5 and that is controlled by an electronic control unit 12 as a function of the pedal force, the pedal travel and/or the brake master cylinder pressure. For this purpose, a pressure sensor 13 is connected to brake master cylinder 1 and brake pedal 4 includes a pedal travel sensor 14.

A pressure sensor 15 is also connected to cylinders 9 of external power brake pressure generator 5. Pressure sensors 13, 15 and pedal travel sensor 14 are connected to electronic control unit 12.

Wheel brake 3 or wheel brakes 3 is/are actuated with the aid of brake master cylinder 1 in the case of an interference or a failure of external power brake pressure generator 5.

Each wheel brake 3 is assigned an inlet valve 16 and an outlet valve 17, with the aid of which slip controls, such as anti-lock systems, traction control systems and/or vehicle dynamics control systems or anti-skid control systems are possible in a conventional manner. The abbreviations ABS, TCS, VDC and ESP are commonly used for these slip control systems. The brake pressure control takes place with the aid of external power brake pressure generator 5 and/or inlet valves 16 and outlet valves 17.

Separating valve(s) 11 and inlet valves 16 are currentless open and external power valve(s) 10 and outlet valves 17 are currentless closed 2/2-way solenoid valves, which is not absolutely necessary for the present invention, however.

According to the present invention, a pressure that prevails in cylinder 9 of external power brake pressure generator 5 upon actuation of the vehicle braking system with the aid of external power brake pressure generator 5 and that is referred to here as pressure generator pressure $p_{Vor}$, is measured with the aid of pressure sensor 15. The measurements take place in preferably constant measurement time intervals $t_{clock}$.

Wheel brake pressure changes $p_{Inc\ i}$ in wheel brakes 3 are ascertained for measured pressure generator pressures $p_{Vor}$, i.e., wheel brake pressure changes $p_{Inc\ i}$ are ascertained during measurement time interval $t_{clock}$ until the next measurement of pressure generator pressure $p_{Vor}$. The sum of measured pressure generator pressure $p_{Vor}$ and wheel brake pressure change $p_{Inc\ i}$ is wheel brake pressure $p_{wheel}$, which will prevail in wheel brakes 3 after measurement time intervals $t_{clock}$.

The ascertainment of wheel brake pressure change $p_{Inc\ i}$ may be a computation using a flow equation, such as the Bernoulli equation, for example. A volume flow of brake fluid from cylinder 9 of piston cylinder unit 6 of external power brake pressure generator 5 into wheel brake(s) 3 and wheel brake pressure changes $p_{Inc\ i}$ resulting therefrom are computed, for example. Another possibility is an ascertainment of wheel brake pressure change $p_{Inc\ i}$ from a characteristic diagram that is experimentally ascertained, for example, and stored. Other types of ascertaining wheel brake pressure change $p_{Inc\ i}$ are also possible. The sum of measured pressure generator pressure $p_{Vor}$ and wheel brake pressure change $p_{Inc\ i}$ during measurement time interval $t_{clock}$ until the next measurement yields the wheel brake pressure in wheel brake(s) 3 at the next measurement of pressure generator pressure $p_{Vor}$.

According to the present invention, however, not only one wheel brake pressure change $P_{Inc\ i}$ is added to the pressure generator pressure, but multiple wheel brake pressure changes $P_{Inc\ i}$ are added to last measured pressure generator pressure $p_{Vor}$. Those wheel brake pressure changes $P_{Inc\ I}$ are added that were ascertained during a time period $t_{Response}$ that is as long as a response time of pressure sensor 15 and a closing time of/of one of inlet valve(s) 16 and that ends with the last measurement of pressure generator pressure $p_{Vor}$. The measurement time intervals $t_{clock}$ are shorter than time period $t_{response}$, so that multiple wheel brake pressure changes $p_{Inc\ i}$ are taken into consideration or added. The sum of last measured pressure generator pressure $p_{Vor}$ and ascertained wheel brake pressure changes $p_{Inc\ i}$ during time period $t_{response}$ or until the measurement is considered to be wheel brake pressures $p_{wheel}$ prevailing in wheel brakes 3 after the same time period $t_{response}$ following the measurement of pressure generator pressure $p_{Vor}$. This thus means that those wheel brake pressures $p_{wheel}$ are ascertained that will theoretically prevail around the response time of pressure sensor 15 and the closing time of/of one of inlet valve(s) 16 after the last measurement of pressure generator pressure $p_{Vor}$ in wheel brakes 3.

Wheel brake pressure changes $p_{Inc\ i}$ ascertained for each measured pressure generator pressure $p_{Vor}$ are written into a ring memory, this being a first in first out memory, in the case of which the oldest value is overwritten by the most recent value. The ring memory has as many memory locations as there are measurements of pressure generator pressure $p_{Vor}$ during time period $t_{response}$. The sum of wheel brake pressure changes $p_{Inc\ i}$ stored in the ring memory is added to last measured pressure generator pressure $p_{Vor}$ and forms the theoretical wheel brake pressure in wheel brakes 3 around time period $t_{response}$ following the measurement.

Inlet valve(s) 16 is/are closed if ascertained future wheel brake pressure $p_{wheel}$ has reached or exceeded setpoint pressure $p_{setpoint}$ after time period $t_{response}$, setpoint pressure $p_{setpoint}$ being predefined by the driver with the aid of brake master cylinder 1 and/or another vehicle dynamics control function, such as for example ABS, TCS and/or VDC or ESP. Here, setpoint pressure $p_{setpoint}$ may be equal to or different from the brake master cylinder pressure.

Future wheel brake pressure $p_{wheel}$ is only ascertained in particular if inlet valve(s) 16 is/are open, pressure generator pressure $p_{Vor}$ increases and/or inlet valve(s) 16 is/are to be closed for a wheel brake pressure control and/or a slip control.

The method according to the present invention is also possible in the case of a muscular power or assisted power actuation of the vehicle braking system with the aid of brake master cylinder 1, which forms muscular power brake pressure generator 2.

What is claimed is:

1. A method for ascertaining a future wheel brake pressure of a hydraulic vehicle braking system including a brake pressure generator, to which a pressure sensor is connected, and to which a hydraulic wheel brake is connected via a valve, the method comprising:
   ascertaining a future wheel brake pressure, which will prevail in the wheel brake after a response time period following an actuation of the vehicle braking system using the brake pressure generator, the ascertaining including:
      during the response time period, measuring a pressure generator pressure a plurality of times using the pressure sensor, a period of time between each two of the measurements of the pressure generator pressure being a measurement time interval;
      for each respective measurement of the measurements of the pressure generator pressure, ascertaining a wheel brake pressure change in the wheel brake during the measurement time interval following the respective measurement of the pressure generator pressure, wherein a sum of those of the wheel brake pressure changes that were ascertained within the response time period and prior to a last measurement of the pressure generator pressure of the response time period, is added to the pressure generator pressure measured last in the response time period, to ascertain the future wheel brake pressure, the response time period being a sum of a response time of the pressure sensor and a closing time of the valve, and the response time period being longer than the measurement time interval.

2. The method as recited in claim 1, wherein the wheel brake pressure changes ascertained during the response time period are written into a ring memory, an oldest wheel brake pressure change being overwritten by a most recent wheel brake pressure change and the sum of the wheel brake pressure changes stored in the ring memory being added to the pressure generator pressure measured last in the response period.

3. The method as recited in claim 1, wherein the wheel brake pressure changes are computed using a flow equation or are experimentally ascertained.

4. The method as recited in claim 1, further comprising closing the valve when the ascertained future wheel brake pressure reaches or exceeds a setpoint pressure.

5. The method as recited in claim 1, wherein the future wheel brake pressure is computed only if the valve is open.

6. The method as recited in claim 1, wherein the future wheel brake pressure is computed only if the pressure generator pressure increases and/or if there is a possibility that the valve is to be closed.

7. The method as recited in claim 1, wherein the valve is an inlet valve, which is assigned to the wheel brake, of a slip control of the vehicle braking system.

8. The method as recited in claim 1, wherein the vehicle braking system includes an external power brake pressure generator.

* * * * *